United States Patent
Yamada et al.

(10) Patent No.: US 6,168,187 B1
(45) Date of Patent: Jan. 2, 2001

(54) COVER FOR AN AIR BAG

(75) Inventors: Tadashi Yamada, Nagoya; Tadashi Yamamoto, Nishikasugai-gun; Toru Koyama, Ama-gun, all of (JP)

(73) Assignee: Toyoda Gosei Co., Ltd., Aichi (JP)

( * ) Notice: Under 35 U.S.C. 154(b), the term of this patent shall be extended for 0 days.

(21) Appl. No.: 09/108,296

(22) Filed: Jul. 1, 1998

(30) Foreign Application Priority Data

Jul. 1, 1997 (JP) .................................................. 9-175808
Dec. 25, 1997 (JP) .................................................. 9-358304

(51) Int. Cl.$^7$ .................................................. B60R 21/20
(52) U.S. Cl. .................................................. 280/728.3
(58) Field of Search .................................. 280/728.3, 731; 29/512; 403/213; 24/457

(56) References Cited

U.S. PATENT DOCUMENTS

| | | | |
|---|---|---|---|
| 1,138,872 | * 5/1915 | Hub | 402/18 X |
| 3,534,447 | * 10/1970 | Muirhead | 402/18 X |
| 5,685,056 | * 11/1997 | Fischer | 280/728.3 |
| 5,851,022 | * 12/1998 | Yamamoto et al. | 280/728.3 |
| 5,901,977 | * 5/1999 | Knox et al. | 280/728.3 |

FOREIGN PATENT DOCUMENTS 1-81351    5/1989   (JP) .
9-175304   7/1997   (JP) .

* cited by examiner

Primary Examiner—Lanna Mai
Assistant Examiner—Lynda Jasmin
(74) Attorney, Agent, or Firm—Pillsbury Madison & Sutro LLP (57) ABSTRACT

An airbag cover has a door section on its front surface with an ornament. On a reverse side of the door section, a leg section of the ornament is inserted via an inserting hole from the front surface side of the door section of the cover. The leg section of the ornament is attached to the door section by a rivet, which penetrates an attaching hole of the leg section and a through-hole of the door section. The ornament is thereby attached to the door section, while an ornamental section of the ornament covers a head portion of the rivet on the front surface side of the door section. In another embodiment, the leg section is sewn to the door section. The ornamental section is attached to the front surface side of the door section by adhering the ornamental section to the door section in the sewing portion and the leg section. The connecting portion of the leg section is bent so that the ornamental section can be arranged to cover the sewing portion of the leg section.

36 Claims, 12 Drawing Sheets

COVER FOR AN AIR BAG

BACKGROUND OF THE INVENTION

1. Field of the Invention

The present invention relates to a cover for an air bag. More particularly, the present invention relates to a structure in which an ornament is attached to a door section is attached to a cover, which can be opened when an air bag is expanded. The air bag device of this invention is mountable on a steering wheel of an automobile or a front portion of an assistant driver's (passenger's) seat. Further, the air bag device of this invention is mountable on a door or a seat of an automobile.

2. Description of Related Art

Conventionally, a cover having a door section opens when an air bag is expanded from a folded state. The cover is constituted in the following manner. The ornament is attached to the door section of the cover by sewing; a leg section extending from the ornament penetrates the door section and is bent so that the leg section can be attached by under-cutting; or the ornament is attached to the door section by a rivet. These techniques are disclosed in Japanese Utility Model Publication No. Hei. 1-81351 and so forth.

In the case of a cover disclosed in Japanese Utility Model Publication No. Hei. 1-81351, the door section of the cover in which the ornament is arranged is made of soft synthetic resin in which a net insert is arranged, and the ornament is sewn to the net insert by elastic threads.

However, when the ornament is attached to the door section by sewing, sewing scams are exposed, thereby deteriorating the artistic design and appearance of the ornament.

SUMMARY OF THE INVENTION

It is an object of the present invention to solve the above problems by providing a cover for an air bag, the cover having an ornament attached to a door section of the cover and covering an air bag of an air bag device. The ornament can be stably attached to the door without deteriorating the artistic design of the cover. Also, a reduction of the space on the surface side of the cover is suppressed, and it is possible to attach the ornament to the door simply and easily.

In accordance with an embodiment the present invention, the cover has a door section capable of opening when a folded air bag is expanded, the cover comprising: an ornament having an ornamenting section and a fixing section; and a fixing means for attaching the fixing section to the door section, wherein the ornamental or ornamenting section of the ornament is attached onto a surface of the door section so that the ornamental section covers the fixing means.

It is preferable that the fixing means is formed of a first leg section extending from a side of the ornamental section, and a connecting portion between the first leg section and the ornamental section is bent so that the ornamental section covers the fixing means.

It is also preferable that the fixing means includes a rivet for attaching the first leg section to the door section on a reverse or rear side of the ornamental section.

In the air bag cover according to the present invention, on a reverse (or rear) side of the door section into which the leg section of the ornament is inserted via an insertion hole from a surface side of the door section, the leg section of the ornament is attached to the door section by a rivet which penetrates an attaching hole of the leg section and a through-hole of the door section. The ornamental section of the ornament covers a head portion of the rivet on the front surface side of the door section.

Thus, the leg section of the ornament, in which the attaching hole is formed, is attached to the door section by the rivet. However, the head portion of the rivet on the front surface side of the door section is covered with the ornamental section of the ornament. Therefore, the artistic design of the door section of the cover is not deteriorated by the rivet.

It is preferable that the ornamental section of the ornament is arranged so that the head portion of the rivet facing the front surface side of the door section is covered with the ornamental section after the leg section of the ornament has been attached to the door section by the rivet. Due to the above arrangement, before the rivet is covered with the ornamental section, it is possible to visually check the head portion of the rivet on the front surface side of the door section as well as a head portion of the rivet on the reverse side of the door section. Accordingly, when the rivet is fastened defectively, it is possible to rivet again, or to remove the defective rivet. In this way, the ornament can be attached to the cover with greater reliability. Since the ornament is attached by riveting, even if the cover is made of thermoplastic elastomer, the ornament can be stably and strongly attached to the cover.

Consequently, according to the present invention, when the ornament is attached to the door section of the cover which covers an air bag of an air bag device, the ornament can be stably attached to the cover without deteriorating the artistic design of the cover.

In the ornament, there is provided a second leg section, which extends from a portion of the periphery of the ornamental section and is substantially symmetrical to the first leg section. There is provided a second inserting hole in the cover door section into which the second leg section can be inserted. When the second leg section is engaged in the second inserting hole to attach the ornament to the door section, both of the leg sections of the ornamental section, which are substantially symmetrically arranged to each other, can be attached to the door section. Therefore, even if the door section is opened at high speed due to expansion of the air bag, it is possible to prevent the ornamental section of the ornament from peeling off from the door section.

A rib protruding from the door section can be provided in the periphery of the leg section of the ornament on the reverse side of the door section to cover the rivet. Even if the folded air bag can extend far enough to reach the head portion of the rivet on the reverse side of the door section, it is difficult for the air bag to contact the head portion of the rivet because of the rib. Therefore, it is possible to prevent the air bag from interfering with the rivet.

After the leg section is sewn to the door section and the ornamental section is adhered to the door section or the leg section to cover the sewing portion, the attaching of the ornament to the door section is complete. As such, the ornament can be simply attached to the door section.

After completion of the attaching operation, the ornamental section adheres to the door section or the leg section in the sewn portion of the leg section, and the ornamental section is connected with the leg section sewn to the door section via the connecting portion. Therefore, even if the adhesion is peeled off, the connection between the ornament and the leg section can be maintained. Accordingly, the ornament is not disconnected from the door section, that is, the ornament can be attached to the door section together with the leg section while a sufficiently high mechanical strength is maintained in the attaching section.

After the ornament is attached, the ornamental section of the ornament adheres to the door section and the leg section, and the connecting portion with the leg section is bent so that the sewing portion is covered with the ornamental section. Accordingly, even if the leg section of the ornament is sewn to the door section, the sewn portion is not exposed to the outside, so that the artistic design is not deteriorated.

After the completion of attaching the ornament, only the seams and the leg section appear on the reverse (rear) side of the cover. The leg section is made of a flexible plate-shaped sheet, not metal. Accordingly, a space on the reverse side of the cover is not decreased, and even if the seams interfere with the folded air bag, there is no possibility of the air bag being damaged.

Therefore, according to the above structure of attaching an ornament, while the artistic design of the cover is not deteriorated and a decrease in the space on the reverse side of the cover is suppressed, the ornament can be simply attached to the door section.

DETAILED DESCRIPTION OF THE PREFERRED EMBODIMENTS

Referring to FIGS. 1 to 8, a first embodiment of the present invention will be explained below.

Figure 1:
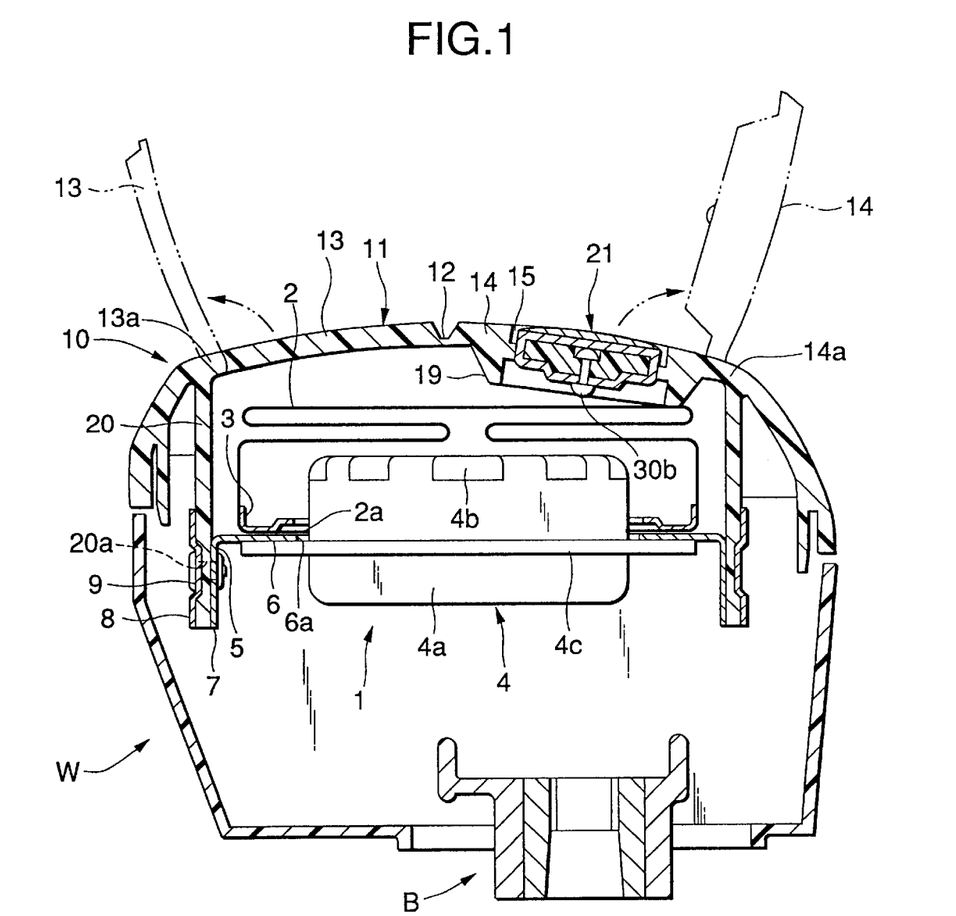
FIG. 1 is a cross-sectional view showing a cover to which an ornament is attached according to a first embodiment of the present invention, as shown in sectional view taken along the line I—I in FIG. 2.

As shown in FIG. 1, a cover 10 to which the ornament 21 is attached is used for an air bag device 1 arranged in an upper portion of boss B located at the center of steering wheel W. The air bag device 1 includes: an air bag 2 which is folded; an inflater 4 for supplying gas used for expanding the air bag 2; and a bag holder 5 for holding the air bag 2, the inflater 4, and the cover 10.

The air bag 2 has a bag-shape with an opening 2a formed at the lower portion. The inflater 4 includes: a columnar main body 4a, with a gas discharge port 4b provided at the upper portion; and a flange 4c which protrudes from an outer circumferential surface of the main body 4a. The bag holder 5 includes: a bottom surface having an insertion hole 6a into which the main body 4a of the inflater is inserted from a lower portion, and a side wall 7 extending downward from the circumferential edge of the bottom wall 6.

The air bag 2 and the inflater 4 are attached to the bag holder 5 as follows. An annular retainer 3, arranged in the circumferential edge of the opening 2a of the air bag 2, is provided with bolts (not shown in the drawing). These bolts penetrate a circumferential edge of the air bag opening 2a, circumferential edge of the insertion hole 6a on the bag holder bottom wall 6, and flange 4c of the inflater 2. Then, these bolts are secured with nuts.

The cover 10 is attached to the bag holder 5 so that a side wall 20, which extends downward from the cover 10, is attached to a side wall 7 of the bag holder 5 via a spacer 8 and rivets 9.

The cover 10 is made of thermoplastic elastomer of polyolefin or styrene. The cover 10 includes: a ceiling wall section 11, which covers an upper portion of the folded air bag 2; and a side wall section 20, which has a substantially square cylinder shape and protrudes downward from a lower surface of the ceiling wall section 11.

At predetermined positions of the side wall section 20, a plurality of attaching holes 20a is provided to attach the cover 10 onto the side wall 7 of the bag holder 5 by rivets 9.

Figure 2:
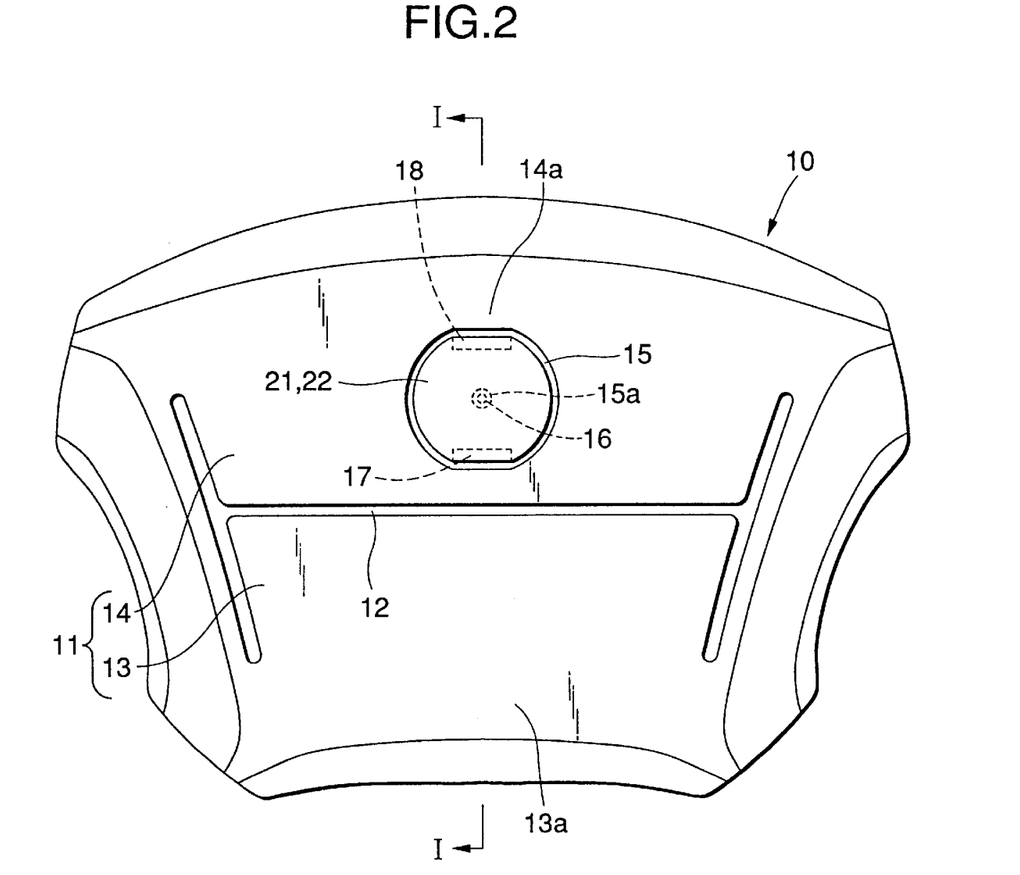
FIG. 2 is a plan view of the cover of the first embodiment.

As shown in FIGS. 1 and 2, in the ceiling wall portion 11, a substantially H-shaped thin portion 12 to be broken is provided. When the air bag 2 is expanded, the portion 12 to be broken is broken so that the two door sections 13 and 14 can be opened as a double door. In order to open the doors 13 and 14, hinge portions 13a and 14a are located at portions close to the side walls 20 in the longitudinal direction of the ceiling wall portion 11.

Figure 3:
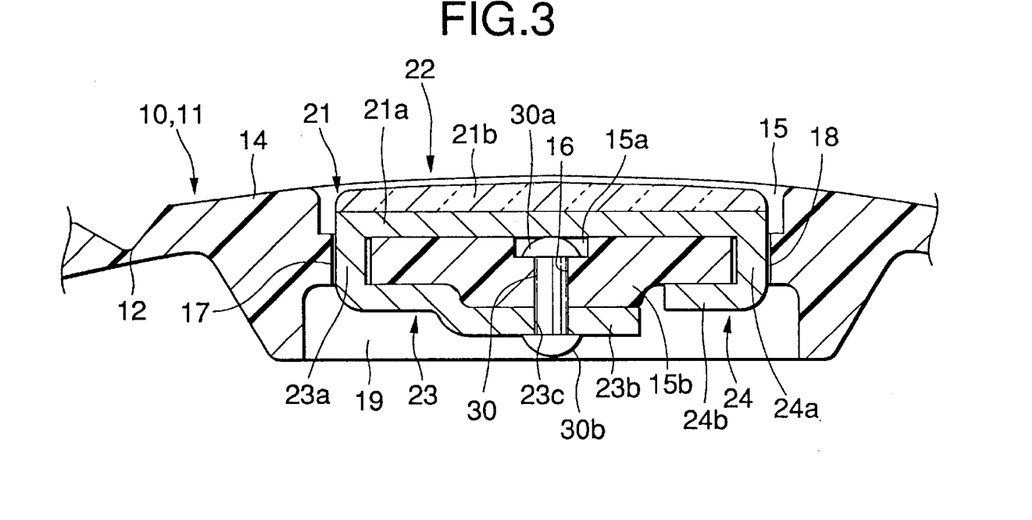
FIG. 3 is a cross-sectional view showing a primary portion of the cover of the first embodiment.

As shown in FIGS. 1 to 3, at a position distant from the portion 12 to be broken on the surface of the door section 14 located in the front of the air bag device 1 arranged in steering wheel W, there is an arrangement portion 15 in which the ornamental section 22 of the ornament 21 is arranged. This arrangement portion 15 is a recess. At the center of the arrangement portion 15, a through-hole 16 penetrating the door section is formed. In order to avoid the occurrence of stress concentration on the inner circumferential surface, the through-hole 16 has a circular cross section. At the circumferential edge of the through-hole 16 on the surface side of the door section 14, there is formed a counter-bored recess 15a so that a head portion 30a of the rivet 30, which will be described later, cannot interfere with a reverse side of the ornamental section 22. On the circumferential edge of the through-hole 16 on the reverse side of the door section 14, a protruding portion 15b, which protrudes downward in order to prevent the mechanical strength of the arrangement portion 15 from deteriorating, is provided.

In the arrangement portion 15, there are a first insertion hole 17 and a second insertion hole 18, which are rectangular and penetrate the arrangement portion 15. The first insertion hole 17 and the second insertion hole 18 are arranged longitudinally on respective sides of the arrangement portion 15 with respect to the through-hole 16.

Figure 4:
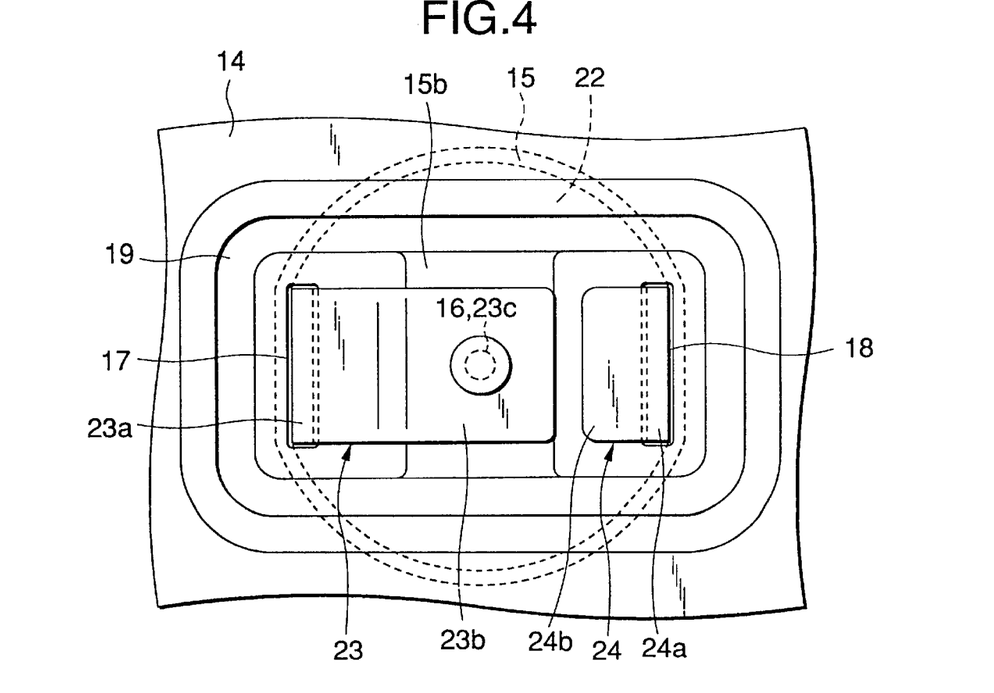
FIG. 4 is a bottom view showing a primary portion of the cover of the first embodiment.

As shown in FIGS. 3 and 4, on the reverse side of the door section 14, there is a substantially square cylindrical rib 19 that surrounds a first leg 23 and a second leg 24 of the ornament 21 (described later). The height of the rib 19 is larger than the height of the head portion 30b of the rivet 30 for attaching the first leg section 23, to be described later.

Figure 5:
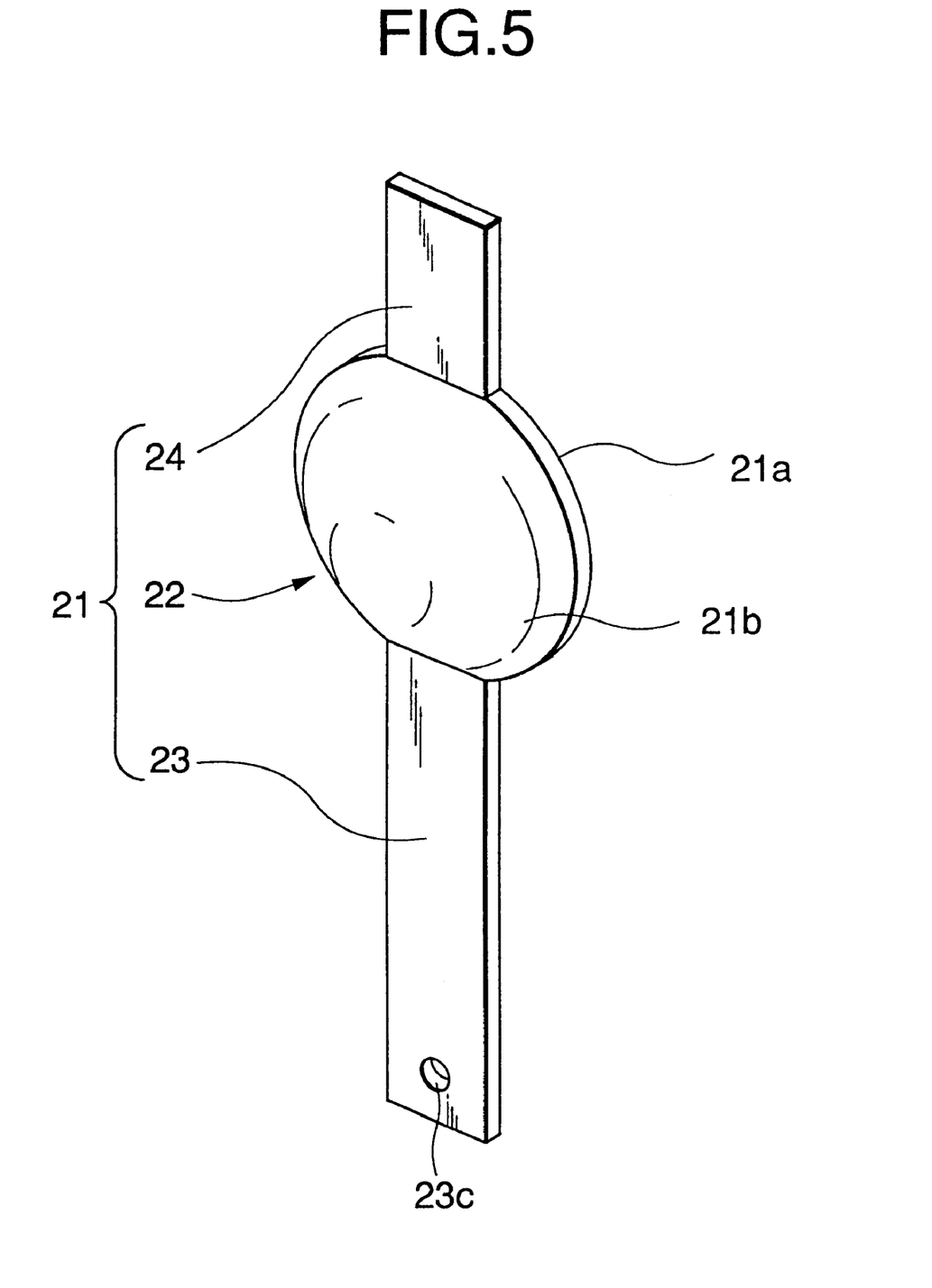
FIG. 5 is a perspective view showing an ornament of the first embodiment.

As shown in FIG. 5, the ornament 21 includes: a base portion 21a made of a thin metallic sheet of iron or aluminum, and a potting layer 21b attached to a center of the base portion 21a. The potting layer 21b is formed of urethane resin or the like. An arrangement portion of the potting layer 21b becomes the ornamental section 22. The ornament 21 is formed so that the first leg section 23 and the second leg section 24 formed by the base portion 21a symmetrically extend from respective sides of the ornamental section 22.

Sections of the first leg section 23 and the second leg section 24 are rectangular so that they can be inserted into the first insertion hole 17 and the second insertion hole 18, respectively, which are formed to correspond to the first leg section 23 and second leg section 24. At a forward end portion 23b of the first leg section 23, which is the longer of the two leg sections 23 and 24, there is an attaching hole 23c corresponding to the through-hole 16.

As shown in FIGS. 1 to 4, the ornament 21 is attached to the door section 14 in the following manner. The first leg section 23 of the ornament 21 is inserted into the first insertion hole 17 from the surface side of the door section 14. Then, at the reverse side of the door section 14, the rivet 30 is inserted into the attaching hole 23c and the door section through-hole 16. In this way, the ornament 21 is attached to the door section 14 by the rivet 30. The rivet 30 used in this embodiment is previously provided with a head portion 30b, that is, the rivet 30 is a calked rivet, the head portion 30b of which is calked and extended.

The ornamental section 22 of the ornament 21 is arranged so that the head portion 30a of the rivet 30 is covered with the ornamental section 22 on the surface side of the door section 14.

The second leg section 24 of the ornament 21 is inserted into the second insertion hole 18 and protruded onto the reverse side of the cover door section 14, and a forward end 24b of the second leg section 24 is bent and engaged with the circumferential edge of the insertion hole 18.

A process for attaching the ornament 21 to the door section 14 will be explained below.

Figure 6:
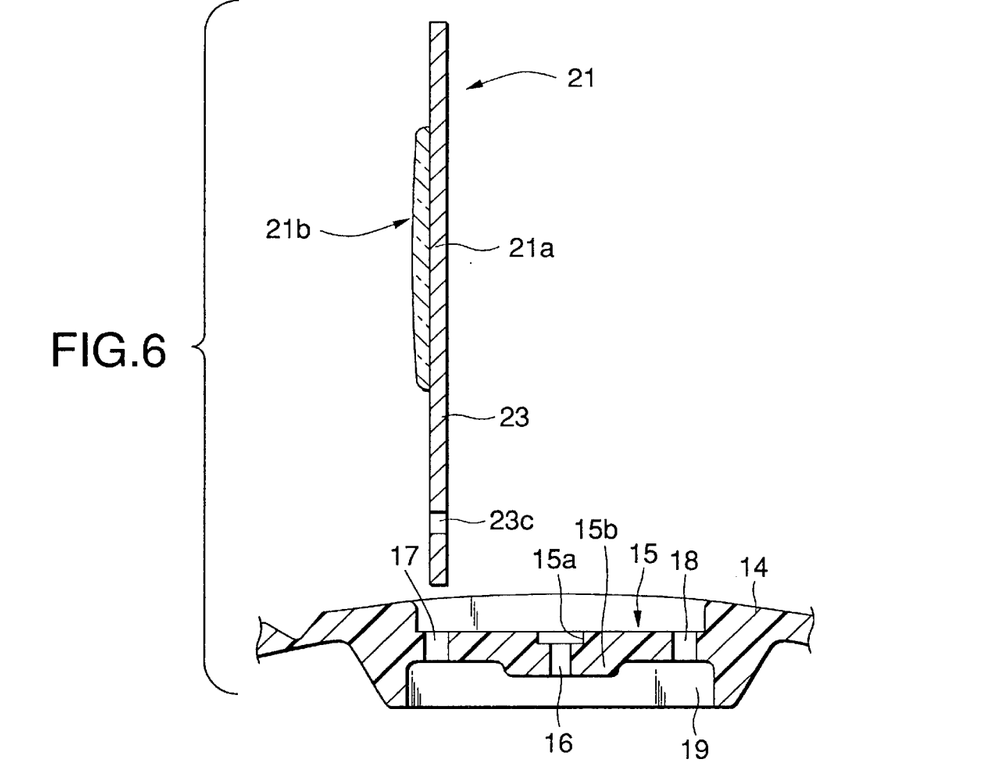
FIG. 6 is a cross-sectional view showing how to attach the ornament of the first embodiment.
Figure 7:
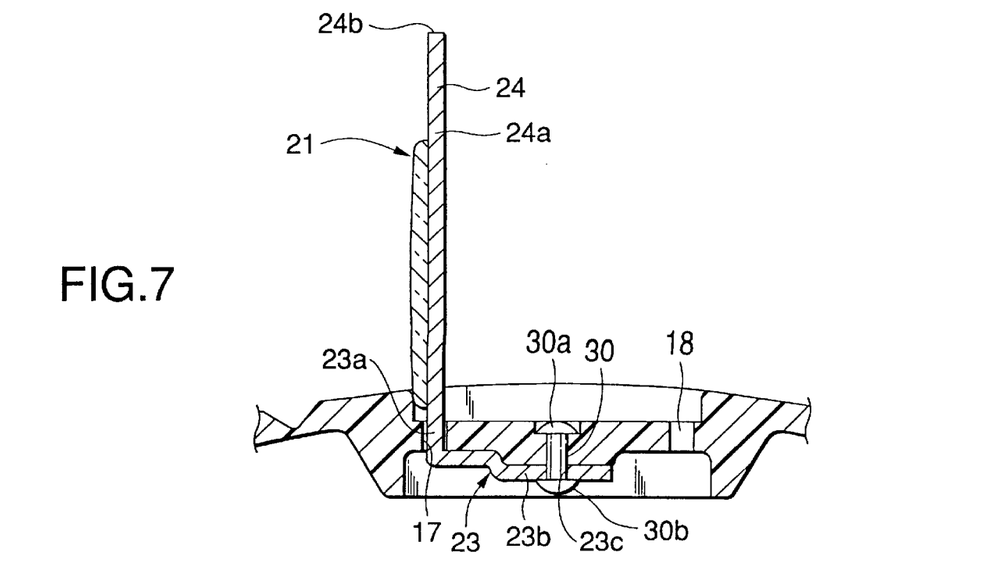
FIG. 7 is a cross-sectional view showing how to attach the ornament of the first embodiment, showing a state after the state shown in FIG. 6.

First, as shown in FIG. 6, the first leg section 23 is inserted into the first insertion hole 17 from the surface side of the door section 14. Next, as shown in FIG. 7, a base end side 23a of the first leg section 23 is bent and the first leg section 23 is further inserted into the first insertion hole 17 until the attaching hole 23c is aligned with the through-hole 16. In this way, a forward end side 23b of the first leg section 23 is arranged on the reverse (rear) side of the door section 14. The rivet 30 is then inserted into the attaching hole 23c and the through-hole 16, and the head portion 30a is formed. The forward end portion 23b of the first leg section 23 of the ornament 21 is thereby attached to the door section 14 by the rivet 30. At this time, both head portions 30a and 30b at opposite end portions of the rivet 30 can be visually checked from the front surface side and the rear side of the door section 14. Accordingly, it is possible to make sure that the rivet 30 is positively fastened. In this connection, when the rivet 30 is fastened, the rivet 30 may be inserted from the surface side of the door section 14.

Next, while a base end side 24a of the second leg section 24 of the ornament 21 is being bent, the forward end portion 24b is inserted into the second insertion hole 18 of the door section 14. Then, a protruding portion of the forward end portion 24b, which protrudes from the rear of the second insertion hole 18, is bent and engaged with the circumferential edge of the insertion hole 18. In this way, the ornament 21 can be securely attached to the door section 14.

The incorporation of the air bag device 1 will now be explained below. A retainer 3 is arranged in the air bag 2. Then, the air bag 2 is folded. A main body 4a of the inflater is inserted into the insertion hole 6a from below, and a bolt of the retainer (not shown in the drawing) is inserted into the bottom wall 6 of the bag holder and the flange portion 4c of the inflater, and then the bolt is attached with a nut. After that, the cover 10 to which the ornament 21 is attached is placed over the folded air bag 2, and then the side wall portion 20 is attached onto the side wall 7 of the bag holder with the rivet 9 to complete the assembling work.

The assembled air bag device 1 may be mounted on steering wheel W by an attaching means (not shown in the drawing) provided in the bag holder 7.

When gas is discharged from a gas discharge port 4b of the inflater 4 after steering wheel W has been incorporated into an automobile, the portion 12 to be broken is pushed and broken by the inflating air bag 2. At the same time, the door sections 13 and 14 are opened, and the air bag 2 protrudes from the ceiling portion 11 of the cover and expands greatly.

In this embodiment, the first leg section 23 of the ornament 21 is attached to the door section 14 with the rivet 30. Therefore, even if the door section 14 is opened at high speed due to the expansion of the air bag 2, there is no possibility of the ornament 21 being disconnected from the door section 14.

According to the structure of attaching the ornament 21 of this embodiment, although the first leg section 23 of the ornament 21 is attached to the door section 14 with the rivet 30, the head portion 30a of the rivet on the surface side of the door section 14 is covered with the ornamental section 22 of the ornament 21. Therefore, the artistic design of the door section 14 of the cover is not deteriorated.

The ornamental section 22 of the ornament 21 may be arranged so that the leg section 23 is bent to cover the head portion 30a of the rivet with the ornamental section 22 after the first leg section 23 has been attached to the door section 14 with the rivet 30. Therefore, before the head portion 30a of the rivet is covered with the ornamental section 22, the head portion 30a of the rivet can be visually checked in the same manner as that of the head portion 30b of the rivet on the reverse side of the door section 14. Since the fastening condition can be visually checked, it is possible to fasten the rivet again when a defectively fastened rivet is found, and it is also possible to remove a defectively fastened rivet. In this way, the ornament 21 of the cover 10 can be stably attached.

Accordingly, in this embodiment, when the ornament 21 is attached to the door section 14 of the cover 1 of the air bag device 1, it is possible to attach the ornament in a highly stable manner without deteriorating the artistic design of the cover 10. Even if the cover 10 is made of thermoplastic elastomer, it is possible to strongly attach the ornament 21 to the door section 14 of the cover 10.

In this embodiment, in the ornament 21, there is a second leg section 24 extending from the ornamental section 22 symmetrically with the first leg section 23, and in the door section 14 of the cover, there is a second insertion hole 18 into which the second leg section 24 can be inserted. The second leg section 24 is bent and engaged with the second insertion hole 18, so that the ornament 21 is attached to the door section 14. Due to the above structure of this embodiment, the two leg sections 23 and 24, which are arranged substantially symmetrically with each other on opposite ends of the ornamental section 22, are attached to the door section 14. Therefore, even if the door section 14 is opened at high speed due to expansion of the air bag 2, it is possible to prevent the ornamental section 22 of the ornament 21 from peeling off from the door section 14.

In the structure of attaching the ornament to the cover of this embodiment, there is a rib 19 protruding from the head portion 30b of the rivet 30, around the leg sections 23 and 24 of the ornament 21 on the reverse side of the door section 14. Therefore, even if the folded air bag 2 can reach the head portion 30b of the rivet on the reverse side of the door section 14, it is difficult for the air bag 2 to contact the head portion 30b of the rivet due to the rib 19. Therefore, it is possible to prevent the air bag 2 from interfering with the rivet 30. In this way, the air bag 2 can be protected.

In this embodiment, the forward end portion 24b of the second leg section 24 of the ornament 21 protrudes from the second insertion hole 18 of the door section 14 and is bent, so that the second leg section 24 can be engaged with the second insertion hole 18. However, it is possible to adopt an arrangement in which an extending portion is attached to the circumferential edge of the insertion hole 18 by an under-cut previously formed in the forward end portion 24b. Alternatively, the second leg section 24 may be designed not to protrude from the second insertion hole 18, but the second leg section 24 may be formed short and thick so that the second leg section 24 can be attached to the second insertion hole 18 by simply inserting the second leg section 24 into the second insertion hole 18.

Further, in this embodiment, the base portion 21a of the ornament 21 is made of a metallic plate that can be deformed plastically. Therefore, even if the second insertion hole 18 and the second leg section 24 are not provided, the ornamental section 22 may be arranged in the arrangement portion 15 when the base portion side 23a of the first leg section 23 is plastically deformed. Due to the above arrangement, even when the door section 14 is opened due to expansion of the air bag 2, there is no possibility of the ornamental section 22 being peeled off from the arrangement portion 15. Consequently, it is possible to eliminate the second insertion hole 18 and the second leg section 24.

When the base end portion 21a of the ornament 21 is made of flexible cloth, it is preferable that a portion corresponding to the second leg section 24 is engaged with the second insertion hole 18 provided in the door section 14. In this case, it is preferable that an extending portion is provided in the forward end portion 24b of the leg section 24, so that the extending portion can be attached to the circumferential edge of the insertion hole 18 on the reverse side of the door section 14 by under-cutting.

Alternatively, if the base end portion 21a of the ornament 21 is made of flexible cloth and the second leg section 24 is not provided, the ornament 21 itself can still be attached to the door section 14 by the first leg section 23 fixed by the rivet 30. Therefore, even if the door section 14 is opened, the ornament 21 is not completely separated from the door section 14. For the above reasons, the ornament 21 may be formed without providing the second leg section 24.

In the above-discussed embodiment, one first leg section 23 and one second leg section 24 are provided. However, the number of first leg sections 23 and second leg sections 24 is not limited to one. When the ornamental section 22 is large, the number of the first leg sections 23 and second leg sections 24 may be appropriately increased. Of course, multiple first leg sections 23 may be provided where there are no second leg sections 24. When the second leg section 24 is provided, it is preferable that the second leg section 24 is arranged substantially symmetrically with the first leg section 23.

Further, in this embodiment, the rivet 30 by which the leg section 23 is attached is a calked rivet. However, instead of the calked rivet, it is possible to use a blind rivet, which can be used from one side of the through-hole 16 or the attaching hole 23c. Further, it is possible to use a rivet made of resin, the head portion of which can be extended and calked when the head portion is heated and softened.

Figure 8:
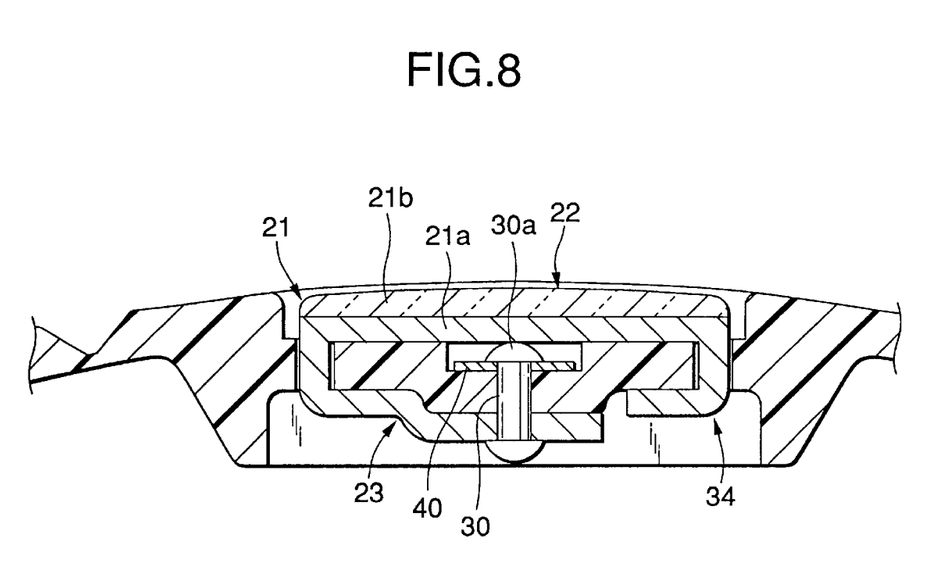
FIG. 8 is a cross-sectional view showing a modification to the first embodiment.

As shown in FIG. 8, when the rivet 30 is used, a spacer 40 may be used so that the mechanical strength of the attached rivet 30 can be enhanced.

Next, referring to FIGS. 9 to 17, a second embodiment of the present invention will be explained as follows. Like reference characters are used to indicate like parts in the first and the second embodiments, and the detailed explanations of like parts described above are omitted below.

Figure 11:
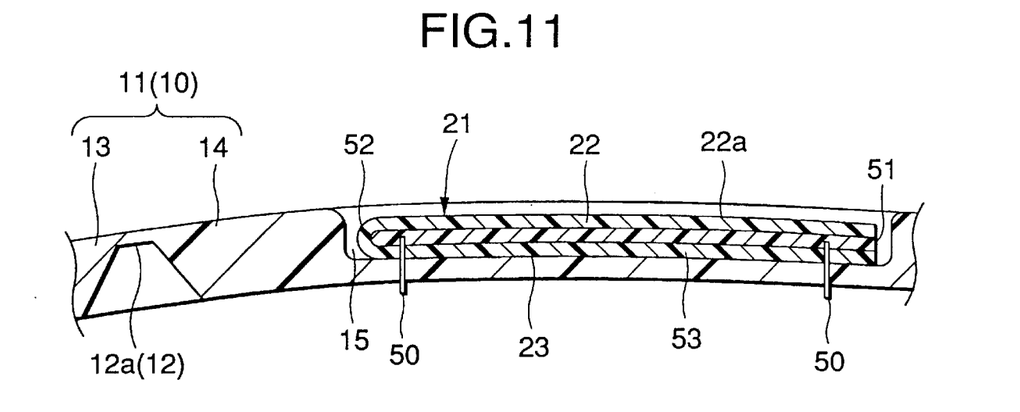
FIG. 11 is an enlarged cross-sectional view showing a state of attaching the ornament of the second embodiment.
Figure 12:
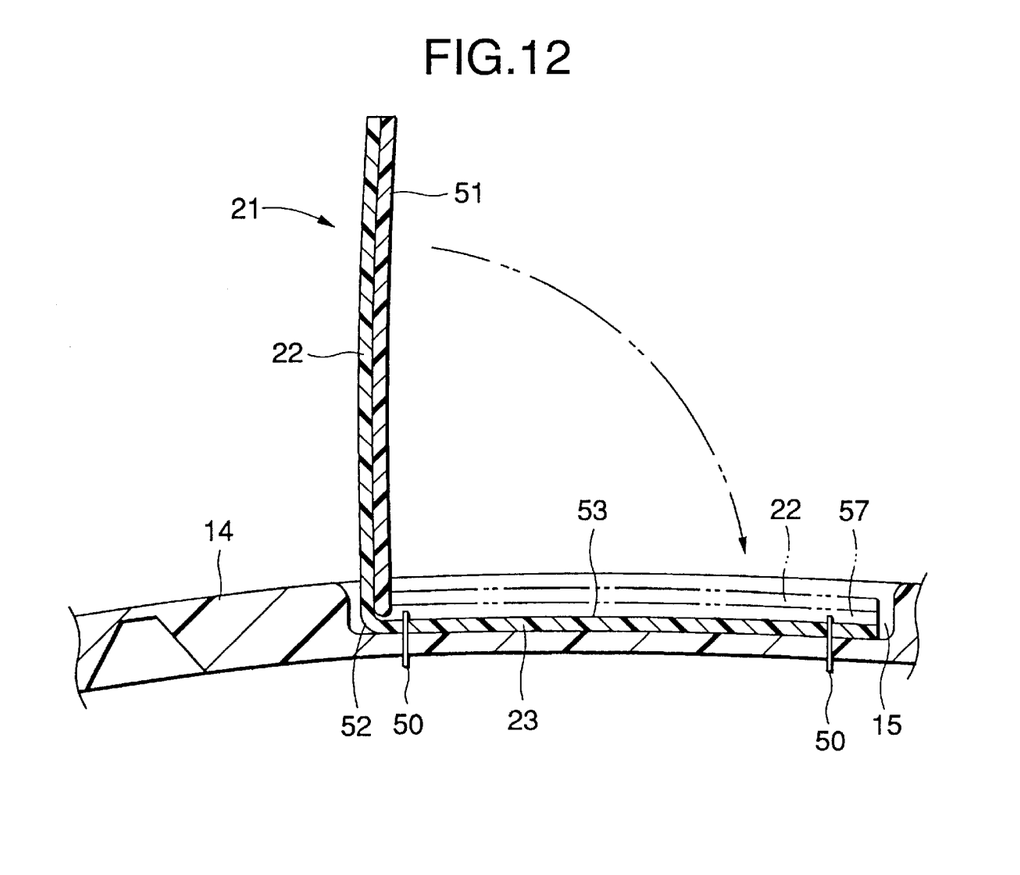
FIG. 12 is a view showing a process of attaching the ornament of the second embodiment.
Figure 13:
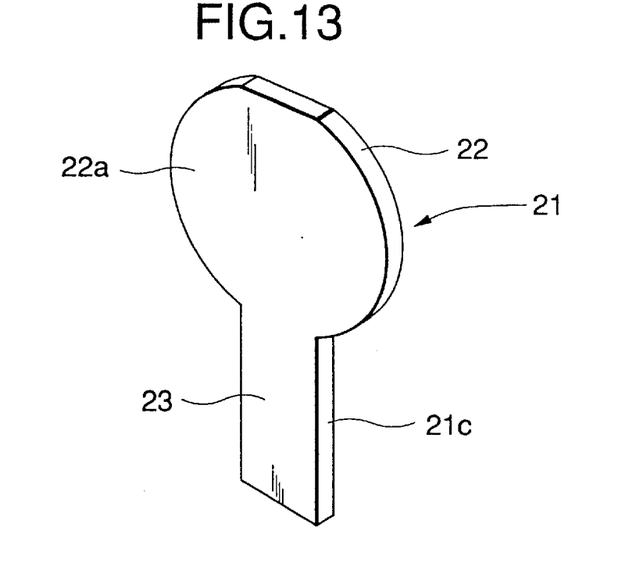
FIG. 13 is a perspective view showing the ornament of the second embodiment.

As shown in FIGS. 11 to 13, the ornament 21 of this embodiment includes: a rectangular plate-shaped leg section 23; and a substantially disk-shaped ornamental section 22 connected with one end of the leg section 23, wherein the ornamental section 22 has a predetermined artistic design surface 22a, on the outer surface of which a predetermined printing or relief is provided. The ornament 21 is formed of a flexible sheet 21c, which is cut into a predetermined shape, made of aluminum, or synthetic resin such as polyurethane, polyester or vinyl chloride, or alternatively made of leather or cloth. On the surface of the ornament 21, the artistic design surface 22a is provided.

As shown in FIGS. 9 to 12, the leg section 23 of the ornament 21 is attached to the arrangement portion 15 by sewing with a sewing thread 50 made of polyester. While utilizing an adhesive layer 51 coated on the reverse side of the ornamental section 22, a connecting portion 52 at which the ornamental section 22 is connected with the leg section 23 is bent, and the ornamental section 22 is adhered to sewing portion 53 of the leg section 23. In this manner, the ornamental section 22 is attached to the arrangement portion 15 and also is made to adhere to the leg section 23.

The ornament 21 is attached to the cover as follows. The leg section 23 is sewn to the arrangement portion 15 on the cover 10 by chain-stitching of the thread 50 with an industrial sewing machine. Next, the adhesive layer 23 is formed on a reverse side of the ornamental section 22. Then, as shown in FIG. 12, the ornamental section 22 is adhered to the door section 14 in the sewing portion 53 and the leg section 23.

In this embodiment the ornamental section 22 adheres to the leg section 23, which is sewn to the surface of the arrangement portion 15 of the door section 14. The ornamental section 22 can be adhered to at least one of the door section 14 via the leg section 23.

The adhesive layer 51 may be provided so that a reverse side of the ornamental section 22 is coated with adhesive. Alternatively, the adhesive layer 51 may be provided so that a pressure sensitive adhesive double coated tape is placed on the reverse side of the ornamental section 22. Alternatively, the adhesive layer 51 may not be provided on the reverse side of the ornamental section 22, but in the arrangement portion 15 or the leg section 23 before the ornamental section 22 is made to adhere.

Also in this embodiment, while the ornamental section 22 of the ornament 21 is connected with the leg section 23 sewn to the door section 14 via the connecting portion 24, the ornamental section 22 can be adhered to the arrangement portion 15 on the door 14 side in the sewn portion 53 and also adhered to the leg section 23. Therefore, even when the adhesive layer is peeled off, the sewn connection between the ornamental section 22 with the leg section 21 can be maintained. Accordingly, there is no possibility that the ornamental section 22 will be disconnected from the door section 14.

The ornamental section 22 of the ornament 21 adheres to the arrangement portion 15 of the door section 14 and the leg section 23, while the connecting portion 52 with the leg section 23 is bent so that the ornamental section 22 covers the sewing portion 53. Therefore, even if the leg section 23 of the ornament 21 is sewn to the door section 14, the sewing portion 53 is not exposed. Therefore, the artistic design and appearance is not deteriorated.

On a reverse side of the cover 10, only seams appear. Accordingly, the space on the reverse side of the cover 10 is not decreased. Further, even when the seams interfere with the folded air bag 2, there is no possibility of the air bag being damaged.

In this embodiment, attachment of the ornament 21 is performed simply by sewing the leg section 23 to the door section 14 and then adhering the ornamental section 22 the door section 14 in the sewing portion 25 and to the leg section 23.

As a result, the ornament 21 can be simply attached in a stable condition while not deteriorating the artistic design of the cover 10 and suppressing a reduction of the space on the reverse side of the cover 10.

Figure 9:
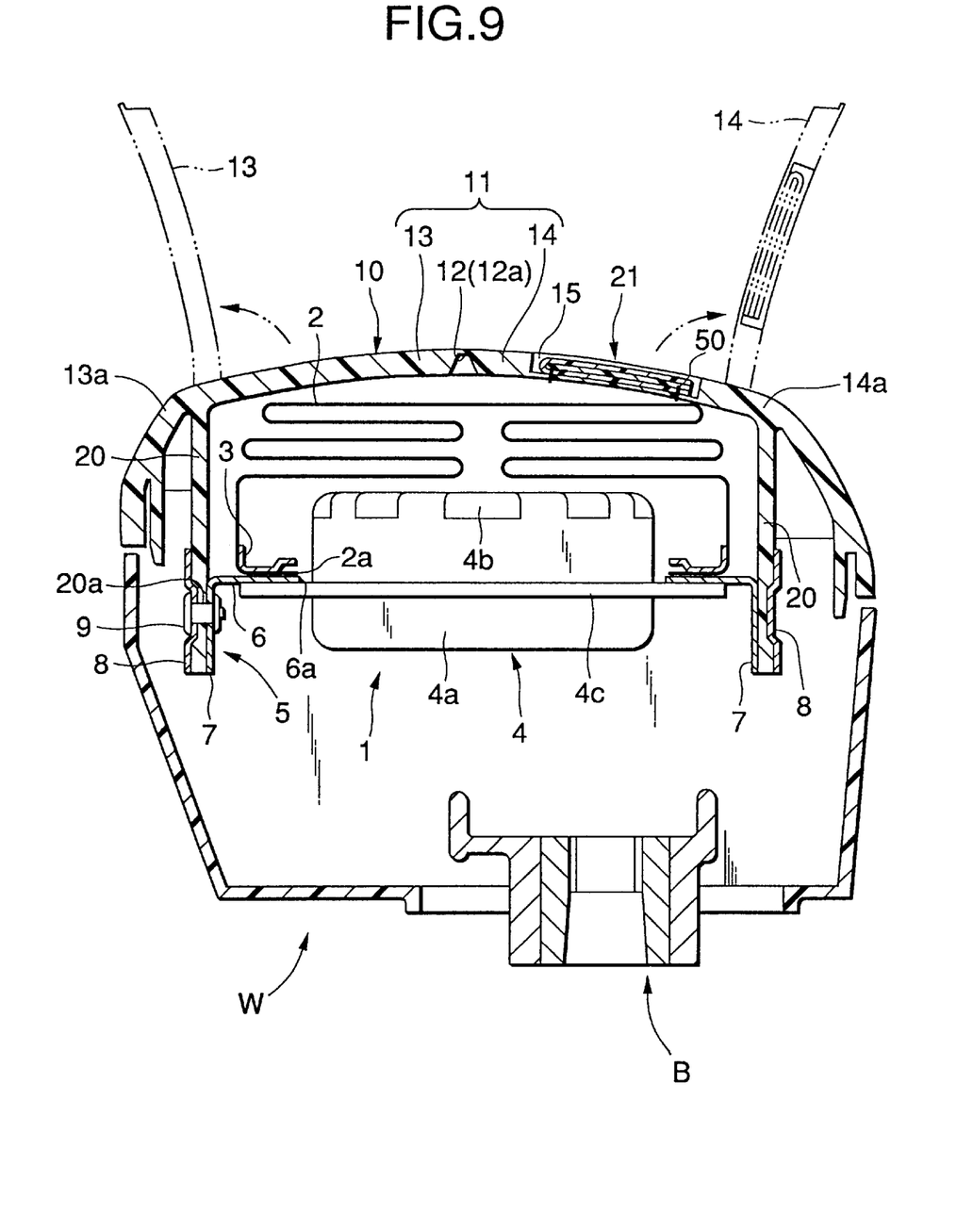
FIG. 9 is a cross-sectional view showing a cover to which an ornament is attached according to a second embodiment of the present invention, taken along the line IX—IX in FIG. 10.
Figure 10:
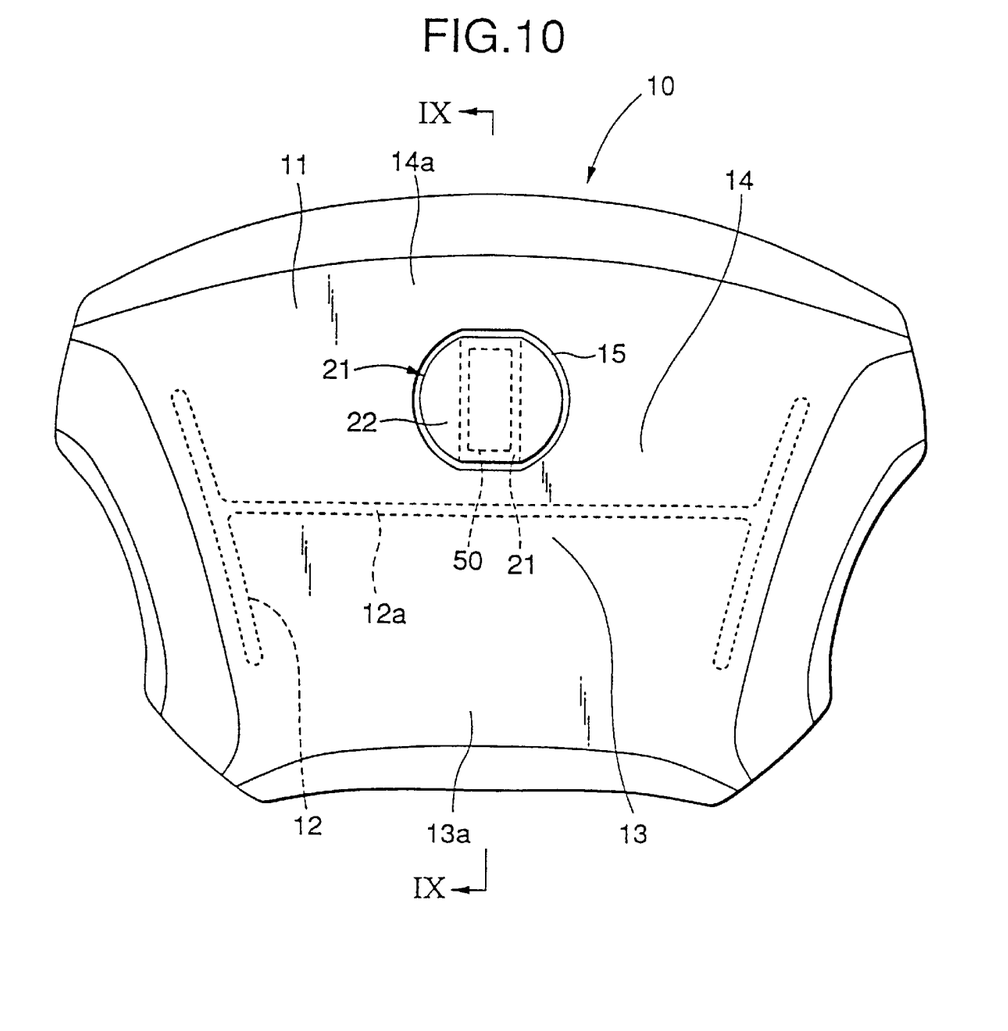
FIG. 10 is a plan view of the cover of the second embodiment.

In the embodiment, the connecting portion 52 at which the ornamental section 22 of the ornament 21 is bent is arranged proximal to an end portion 12a on the development side between the door sections 13 and 14, the developing speed of which is highest. Therefore, as compared with an arrangement in which the connecting portion 52 is arranged in the opposite direction, it is possible to prevent the adhesive layer 51 from peeling off.

Figure 14:
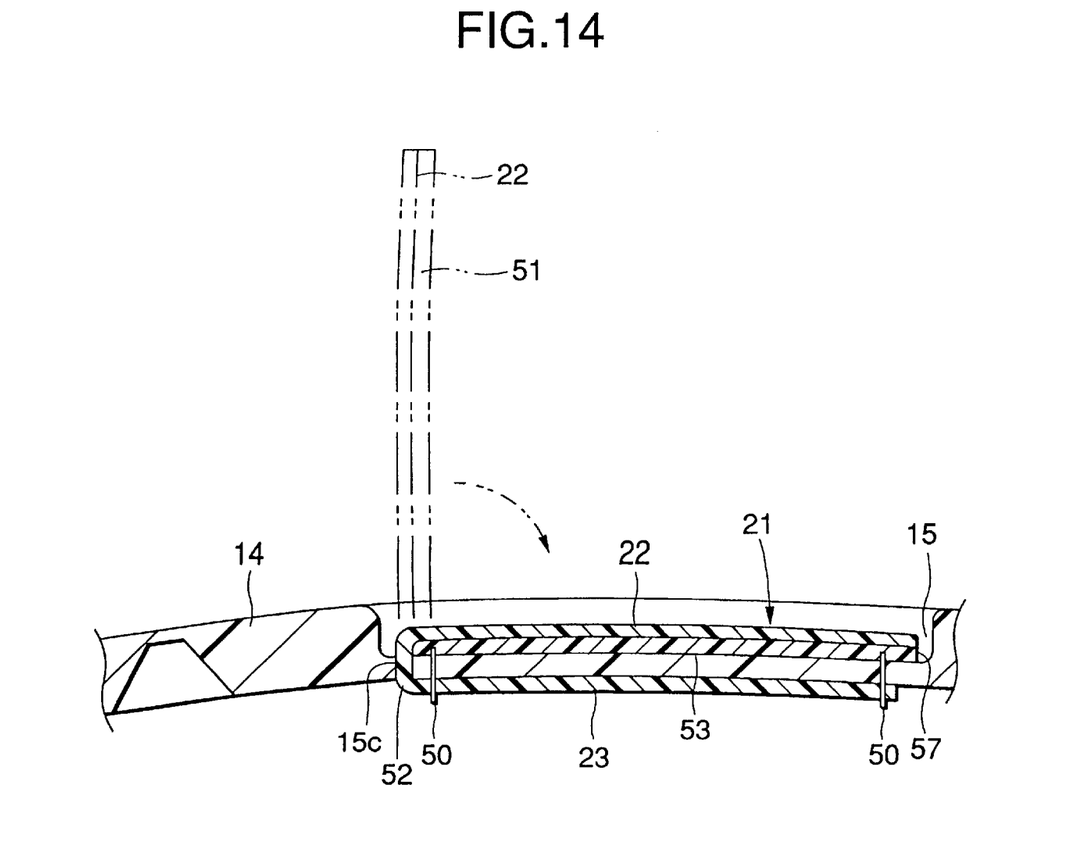
FIG. 14 is a cross-sectional view showing a state of attaching an ornament of another embodiment.

In the above-discussed embodiment, the leg section 23 of the ornament 21 is arranged and sewn on the surface side of the arrangement portion 15 of the door section 14. However, the following arrangement may be adopted. As shown in FIG. 14, in the arrangement portion 15, there is a through-hole 15c, which penetrates the connecting portion 24. The ornamental section 22 is arranged on the front surface side of the arrangement portion 15, whereas the leg section 23 is arranged on the reverse side of the arrangement portion 15 via the through-hole 15c, and the leg section 23 is sewn onto the reverse side of the arrangement portion 15. In this illustrated embodiment, the leg section 23 is thin and flat. Further, the leg section 23 is formed of a flexible sheet member 21c. Therefore, the available space on the reverse side of the cover 10 is not decreased, and the air bag 2 is not damaged even when the leg section 23 interferes with the airbag 2. In the above arrangement, it is possible to make the ornamental section 22 adhere onto the surface of the arrangement portion 15 smoothly. Therefore, the adhesive strength can be stabilized. In this connection, a portion to which the ornamental section 22 adheres in this case is only the surface side of the arrangement portion 15 in the door section 14.

Figure 15:
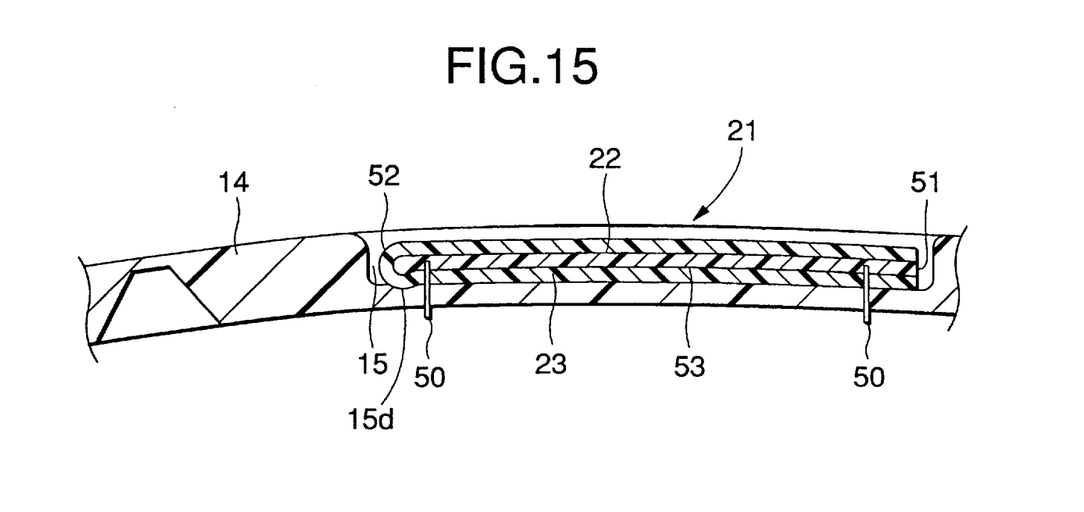
FIG. 15 is a cross-sectional view showing a state of attaching an ornament of still another embodiment.
Figure 16:
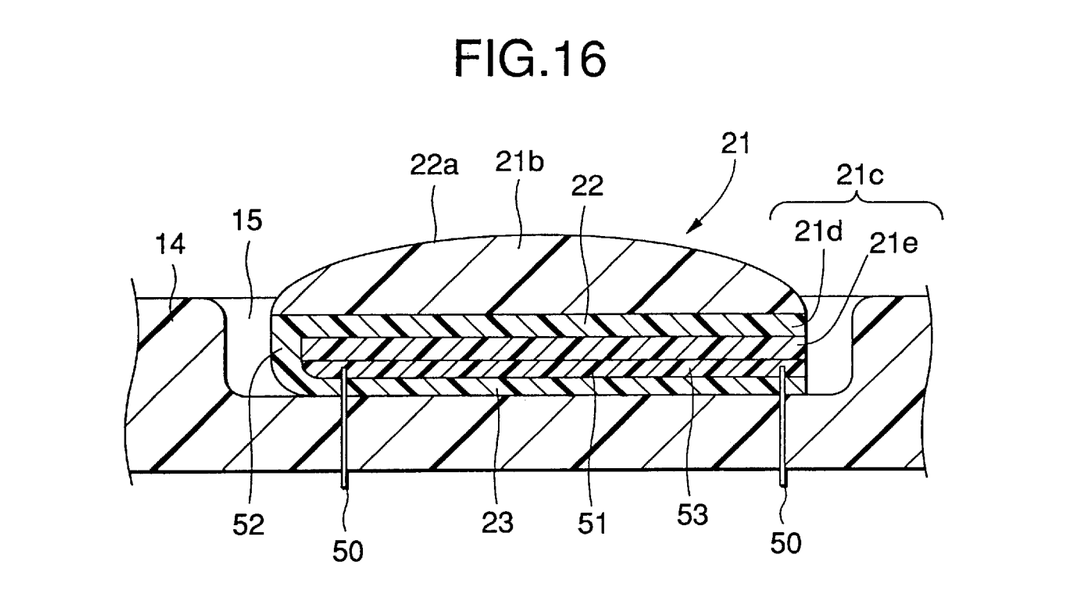
FIG. 16 is a cross-sectional view showing a state of attaching an ornament of still another embodiment.

In the case where the connecting portion 52 is bulky and the ornamental section 22 of the ornament 21 is bent, an accommodating recess 15d may be formed in the arrangement portion 15, as shown in FIG. 15. In the case where the sheet member 21c forming the ornament 21 is formed by a plurality of layers including the base layer 21d and cushion layer 21e as shown in FIG. 16, the predetermined layer 21e may be cut off so that the connecting portion 52 is not bulky. In FIG. 16, reference numeral 51 represents an adhesive layer.

Figure 17:
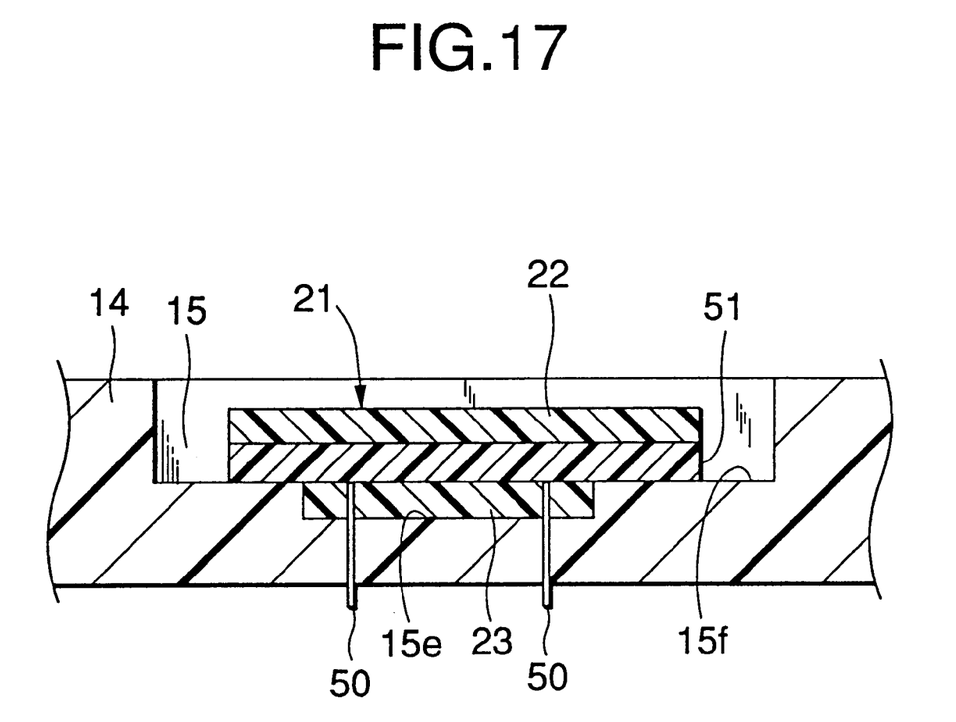
FIG. 17 is a cross-sectional view showing a state of attaching an ornament of still another embodiment, taken in a direction perpendicular to the cross-sectional direction shown in FIG. 11.

In the case where the leg section 23 is sewn to the arrangement portion 15, an accommodating recess 15e for accommodating the leg section 21 is provided on the surface side of the arrangement portion 15, as shown in FIG. 17. In FIG. 14, an accommodating recess 15e for accommodating the leg section 21 is provided on a reverse side of the arrangement portion 15. Due to the above arrangement, the leg section 23 can be easily positioned and the sewing work can be carried out easily. In the case where the accommodating recess 15e is provided on the surface side of the arrangement portion 15, the depth of the accommodating recess 15e is the same as the thickness of the leg section 23. Due to the foregoing, it is possible to make the ornamental section 22 adhere smoothly to the leg section 23 and the general portion 15f in the arrangement portion 15 around the ornamental section. Therefore, the adhesive strength of the ornamental section 22 can be stabilized.

The ornamental section 22 is formed into the predetermined artistic design surface 22a on which printing or relief is provided, as shown in the embodiments. In addition, the first embodiment may be adopted, or alternatively the artistic design surface 22a may be provided so that a different member, such as a potting layer 21b, adheres to the sheet member 21d, as shown in FIG. 16.

In the aforementioned embodiments, explanations are made for a case in which the ornament 21 is attached to the cover 10 arranged in steering wheel W. However, it is possible to apply the present invention to a cover which covers an air bag of an air bag device attached to a front portion of an assistant driver's seat, and also an air bag device attached to a door or a seat.

What is claimed is:

1. A structure for attaching an ornament to a door section of a cover, the structure comprising:

a cover comprising a door section and having a front side and a rear side, the door section being constructed and arranged to allow an airbag to be covered and to be opened by expansion of the air bag;

fixing means penetrating the cover to extend from the front side to the rear side of the cover; and an ornament having an ornamental section and a fixing section, the ornamental section being attached to a surface of the door section to cover the fixing means from the front side of the cover, the fixing section being attached to the door section by the fixing means, wherein the fixing section comprises a first leg section extending from a side of the ornamental section, and a connecting portion between the first leg section and the ornamental section, the connecting portion being bent so that the ornamental section covers the fixing means.

2. The structure of claim 1, wherein the fixing means comprises a rivet attaching the first leg section to the door section on a rear side of the ornamental section.

3. The structure of claim 3, wherein:
the first leg section has an attaching hole formed therein;
the door section of the ornament has an arrangement portion with a through-hole formed therein;
the door section has a first insertion hole into which the first leg section of the ornament is inserted, the first insertion hole formed at a position close to the through-hole to allow the attaching hole of the first leg section to be aligned with the through-hole of the door section;
the rivet penetrates the attaching hole of the first leg section and the through-hole of the door section to attach the first leg section of the ornament to the door section; and
the ornamental section of the ornament covers a head portion of the rivet on a front surface side of the door section.

4. The structure of claim 3, wherein the ornament comprises a second leg section extending substantially symmetrically with the first leg section, and wherein the door section comprises a second insertion hole into which the second leg section is inserted to engage the second insertion hole.

5. The structure of claim 3, the structure further comprising a rib protruding from the door section farther than the rivet and disposed around the arrangement portion of the ornament on a rear side of the door section.

6. The structure of claim 1, wherein the first leg section is sewn to the door section to form the fixing means, and wherein the ornamental section covers a sewing portion between the first leg section and the door section.

7. The structure of claim 6, wherein the ornament comprises an adhesive layer for maintaining the connecting portion bent.

8. The structure of claim 7, wherein the ornamental section adheres to the first leg section.

9. The structure of claim 7, wherein the ornamental section adheres to the door section.

10. A cover for covering a folded expandable air bag, the cover having a front side and a rear side and comprising:
a door section constructed and arranged to be opened by expansion of the air bag;
fixing means penetrating the cover to extend from the front side to the rear side of the cover; and
an ornament having an ornamental section and a fixing section, the ornamental section being attached to a surface of the door section to cover the fixing means from the front side of the cover, the fixing section being attached to the door section by the attachment mechanism,
wherein the fixing section comprises a first leg section extending from a side of the ornamental section, and a connecting portion between the first leg section and the ornamental section, the connecting portion being bent so that the ornamental section covers the fixing means.

11. The cover according to claim 10, wherein the fixing means comprises a rivet attaching the first leg section to the door section on a rear side of the ornamental section.

12. The cover according to claim 11, wherein:
the first leg section has an attaching hole formed therein;
the door section of the ornament has an arrangement portion with a through-hole formed therein;
the door section has a first insertion hole into which the first leg section of the ornament is inserted, the first insertion hole formed at a position close to the through-hole to allow the attaching hole of the first leg section to be aligned with the through-hole of the door section;
the rivet penetrates the attaching hole of the first leg section and the through-hole of the door section to attach the first leg section of the ornament to the door section; and
the ornamental section of the ornament covers a head portion of the rivet on a front surface side of the door section.

13. The cover according to claim 12, wherein the ornament comprises a second leg section extending substantially symmetrically with the first leg section, and wherein the door section comprises a second insertion hole into which the second leg section is inserted to engage the second insertion hole.

14. The cover according to claim 12, the cover further comprising a rib protruding from the door section farther than the rivet and disposed around the arrangement portion of the ornament on a rear side of the door section.

15. The cover according to claim 10, wherein the first leg section is sewn to the door section to form the fixing means, and wherein the ornamental section covers a sewing portion between the first leg section and the door section.

16. The cover according to claim 15, wherein the ornament comprises an adhesive layer for maintaining the connecting portion bent.

17. The cover according to claim 16, wherein the ornamental section adheres to the first leg section.

18. The cover according to claim 16, wherein the ornamental section adheres to the door section.

19. A structure for attaching an ornament to a door section of a cover, the structure comprising:
a cover comprising a door section and having a front side and a rear side, the door section being constructed and arranged to allow the door section to cover an airbag and to opened by expansion of the air bag;
an attachment mechanism penetrating the cover to extend from the front side to the rear side of the cover; and
an ornament having an ornamental section and a fixing section, the ornamental section being attached to a surface of the door section to cover the attachment mechanism, the fixing section being attached to the door section by the attachment mechanism,
wherein the fixing section comprises a first leg section extending from a side of the ornamental section, and a connecting portion between the first leg section and the ornamental section, the connecting portion being bent so that the ornamental section covers the attachment mechanism.

20. The structure of claim 19, wherein the attachment mechanism comprises a rivet attaching the first leg section to the door section on a rear side of the ornamental section.

21. The structure of claim 20, wherein:
the first leg section has an attaching hole formed therein;
the door section of the ornament has an arrangement portion with a through-hole formed therein;
the door section has a first insertion hole into which the first leg section of the ornament is inserted, the first insertion hole formed at a position close to the through-hole to allow the attaching hole of the first leg section to be aligned with the through-hole of the door section;
the rivet penetrates the attaching hole of the first leg section and the through-hole of the door section to attach the first leg section of the ornament to the door section; and
the ornamental section of the ornament covers a head portion of the rivet on a front surface side of the door section.

22. The structure of claim 21, wherein the ornament comprises a second leg section extending substantially symmetrically with the first leg section, and wherein the door section comprises a second insertion hole into which the second leg section is inserted to engage the second insertion hole.

23. The structure of claim 21, the structure further comprising a rib protruding from the door section farther than the rivet and disposed around the arrangement portion of the ornament on a rear side of the door section.

24. The structure claim 19, wherein the first leg section is sewn to the door section to form the attachment mechanism, and wherein the ornamental section covers a sewing portion between the first leg section and the door section.

25. The structure of claim 24, wherein the ornament comprises an adhesive layer for maintaining the connecting portion bent.

26. The structure of claim 25, wherein the ornamental section adheres to the first leg section.

27. The structure of claim 25, wherein the ornamental section adheres to the door section.

28. A cover for covering a folded expandable air bag, the cover having a front side and a rear side and comprising:
   a door section constructed and arranged to be opened by expansion of the air bag;
   an attachment mechanism penetrating the cover to extend from the front side to the rear side of the cover; and
   an ornament having an ornamental section and a fixing section, the ornamental section being attached to a surface of the door section to cover the attachment mechanism from the front side of the cover, the fixing section being attached to the door section by the attachment mechanism,
   wherein the fixing section comprises a first leg section extending from a side of the ornamental section, and a connecting portion between the first leg section and the ornamental section, the connecting portion being bent so that the ornamental section covers the attachment mechanism.

29. The cover according to claim 28, wherein the attachment mechanism comprises a rivet attaching the first leg section to the door section on a rear side of the ornamental section.

30. The cover according to claim 29, wherein:
   the first leg section has an attaching hole formed therein;
   the door section of the ornament has an arrangement portion with a through-hole formed therein;
   the door section has a first insertion hole into which the first leg section of the ornament is inserted, the first insertion hole formed at a position close to the through-hole to allow the attaching hole of the first leg section to be aligned with the through-hole of the door section;
   the rivet penetrates the attaching hole of the first leg section and the through-hole of the door section to attach the first leg section of the ornament to the door section; and
   the ornamental section of the ornament covers a head portion of the rivet on a front surface side of the door section.

31. The cover according to claim 30, wherein the ornament comprises a second leg section extending substantially symmetrically with the first leg section, and wherein the door section comprises a second insertion hole into which the second leg section is inserted to engage the second insertion hole.

32. The cover according to claim 30, the cover further comprising a rib protruding from the door section farther than the rivet and disposed around the arrangement portion of the ornament on a rear side of the door section.

33. The cover according to claim 28, wherein the first leg section is sewn to the door section to form the attachment mechanism, and wherein the ornamental section covers a sewing portion between the first leg section and the door section.

34. The cover according to claim 33, wherein the ornament comprises an adhesive layer for maintaining the connecting portion bent.

35. The cover according to claim 34, wherein the ornamental section adheres to the first leg section.

36. The cover according to claim 34, wherein the ornamental section adheres to the door section.

* * * * *